United States Patent [19]

Williams

[11] Patent Number: 4,480,403
[45] Date of Patent: Nov. 6, 1984

[54] APPARATUS FOR SUPPORTING A CANTILEVERED BEAM FROM A T-SHAPED POST

[76] Inventor: Wilburn R. Williams, R.R. 2, Atoka, Okla. 73425

[21] Appl. No.: 518,198

[22] Filed: Jul. 28, 1983

[51] Int. Cl.³ ............................................. A01G 17/06
[52] U.S. Cl. ......................................... 47/42; 47/44; 47/47
[58] Field of Search ..................... 47/42, 43, 44, 47; 248/125, 146, 156, 219.4, 298

[56] References Cited

U.S. PATENT DOCUMENTS

| | | | |
|---|---|---|---|
| 318,343 | 5/1885 | Baublits | 248/244 |
| 692,858 | 2/1902 | Kade | 248/245 |
| 720,667 | 2/1903 | Cartwright | 47/43 |
| 2,146,113 | 2/1939 | Erickson | 40/607 |
| 2,296,217 | 9/1942 | Maloney | 47/43 |
| 2,447,228 | 8/1948 | Boston | 248/219.1 |
| 2,559,302 | 7/1951 | Louft | 40/607 |
| 2,738,941 | 3/1956 | Laurich et al. | 248/156 |
| 2,937,766 | 5/1960 | Penn | 211/193 |
| 3,198,465 | 8/1965 | Sutton | 248/125 |
| 3,612,460 | 12/1969 | Smith | 248/231 |
| 3,854,685 | 12/1974 | Parduhn | 248/214 |
| 3,870,262 | 3/1975 | Manning, Jr. | 248/145 |
| 4,078,754 | 3/1978 | Gould | 248/218.4 |
| 4,250,647 | 2/1981 | Woodward | 47/47 |
| 4,307,540 | 12/1981 | Reisner | 47/43 |

FOREIGN PATENT DOCUMENTS

| | | | |
|---|---|---|---|
| 689072 | 6/1964 | Canada | 248/158 |
| 18735 | 1/1982 | Fed. Rep. of Germany | 47/47 |
| 135655 | 5/1952 | Sweden | 248/298 |

Primary Examiner—Robert A. Hafer
Assistant Examiner—Bradley M. Lewis
Attorney, Agent, or Firm—Laney, Dougherty, Hessin & Beavers

[57] ABSTRACT

A support apparatus for supporting a cantilevered beam from a T-shaped post. A bracket having a cross-shaped aperture therein composed of a pair of spaced horizontal plates joined along one edge by vertical center plates is attached to an end of the cantilevered beam for sliding registry with the post. A bolt is threaded through a hole in the center plate to bear against the post, and an alternate method utilizes two bolts. The first embodiment disclosed uses a first collar portion attached to a free end of the beam and a second collar portion to form a cylindrical collar for a plant support. The second embodiment utilizes a flat plate on the cantilevered beam for supporting a mailbox or the like. A third embodiment has a pair of hooks attached to the cantilevered beam for hanging support of a sign. The fourth embodiment includes a pair of outwardly curving horizontal arms each of which has a cylindrical pin extending upwardly therefrom for registry in corresponding holes in a device to be supported such as the plant holder disclosed in U.S. Pat. No. 4,249,342.

22 Claims, 8 Drawing Figures

APPARATUS FOR SUPPORTING A CANTILEVERED BEAM FROM A T-SHAPED POST

BACKGROUND OF THE INVENTION

1. Field of the Invention

This invention relates to support apparatus for supporting a cantilevered beam from an upright post of T-shaped cross section, and more particularly relating, but not by way of limitation, where such cantilevered beam is used as a plant support, mailbox holder or sign support.

2. Brief Description of the Prior Art

A number of types of supports for attachment to T-shaped posts have been heretofore devised which have been used to support mailboxes or signs. None of the previous supports have utilized a pair of spaced horizontal plates having a cross-shaped aperture therein for sliding registry with the post and a center plate attached along an edge of said plates having at least one bolt therethrough to bear against the post. Some previous supports require registration with pre-drilled holes in the post which is avoided with the present invention. Other previous supports require the cantilevered beam to be tilted while being moved to various positions on the post. This feature is frequently undesirable, particularly when the apparatus is used as a plant support, and the present invention presents no such problems. The plant support disclosed in U.S. Pat. No. 4,249,342, held by the inventor of the present invention, requires guide lines to be run from the ground to a plant support collar. The present invention provides another means of support for the collar which eliminates the necessity of guide lines.

BRIEF DESCRIPTION OF THE PRESENT INVENTION

The support apparatus for a cantilevered beam of the present invention attaches to an upright post of substantially T-shaped cross section composed of a transverse flange and a base flange extending perpendicular from a side thereof. On an opposite side of the transverse flange protrudes a spaced series of tangs. A bracket having a cross-shaped aperture therein is formed by a pair of spaced horizontal plates joined along one edge by a vertical center plate. The center plate has a threaded hole therethrough, and a bolt is threaded through the hole to bear against a surface of the transverse flange between a pair of tangs. In an alternate method of fastening, the center plate has a pair of holes with a bolt threaded through each. These bolts bear against the surface of the transverse flange, straddling the series of tangs.

Several embodiments of the invention are described, and in each of these embodiments the cantilevered beam has a first end disposed between the two spaced plates of the bracket, fixedly attached thereto by welding or the like.

In the first embodiment, the apparatus is characterized as a plant support generally used in conjunction with a plant such as a tree. The cantilevered beam is composed of a first tubular member having a second tubular member slidingly disposed therein. A plurality of holes are vertically disposed in both tubes, and at least one bolt passes through a hole in the first tubular member and a corresponding hole in the second tubular member to hold the tubes in a predetermined relationship. Attached to a free end portion of the beam is a first semi-cylindrical collar portion opening radially outwardly with a second semi-cylindrical collar portion attached thereto. Bolts and nuts are used to hold the collar portions together to form a cylindrical collar means around the stem of the tree. A sheet of resilient material is placed between the collar means and the stem of the tree to provide protection for the stem.

A second embodiment of the invention characterizes a support for a mailbox or the like. In this embodiment, the horizontal beam has a horizontal rectangular plate attached thereto. The plate is substantially the same size as the lower surface of the mailbox, and is interchangeable with other similar plates.

In a third embodiment of the invention, the cantilevered beam acts as a support for a hanging sign. The beam has a pair of spaced vertical holes disposed therethrough, and a pair of hooks having a threaded upper portion extend through the holes, secured by nuts. The sign is swingingly connected to the hooks.

In the fourth embodiment of the present invention, the apparatus is characterized as a support for a plant holder such as that disclosed in U.S. Pat. No. 4,249,342. The cantilevered beam is composed of a first tube portion and a second tube portion slidingly disposed therein identical to that previously described in the first embodiment. Attached to the free end of the beam are a pair of outwardly curving horizontal arms which form a semi-circular yoke. Extending upwardly from, and perpendicular to, each of the arms is a cylindrical pin. Each of the pins registers through a pair of holes in the plant holder, thus providing support for the plant holder which rests on the yoke. In this embodiment, the invention may also be used as a support for any device having similar holes therein, and is not limited to the invention of U.S. Pat. No. 4,249,342.

BRIEF DESCRIPTION OF THE DRAWINGS

FIG. 5 is an elevation view showing the apparatus as a support for a mailbox or the like.

DETAILED DESCRIPTION OF THE PREFERRED EMBODIMENTS OF THE INVENTION

Figure 1:
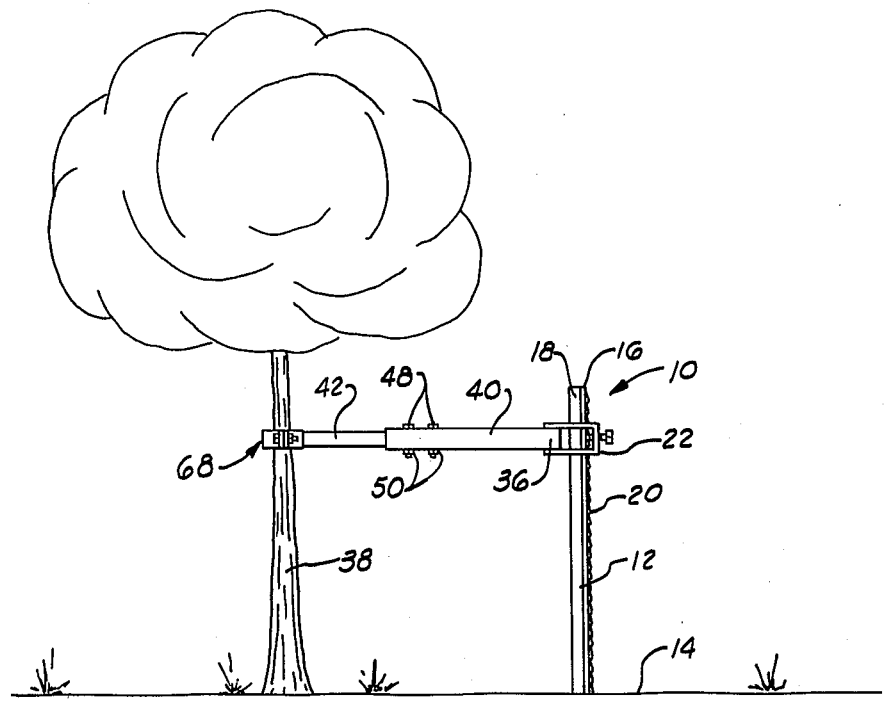
FIG. 1 is an elevation view of the invention in which the apparatus is characterized as a plant support.
Figure 2:
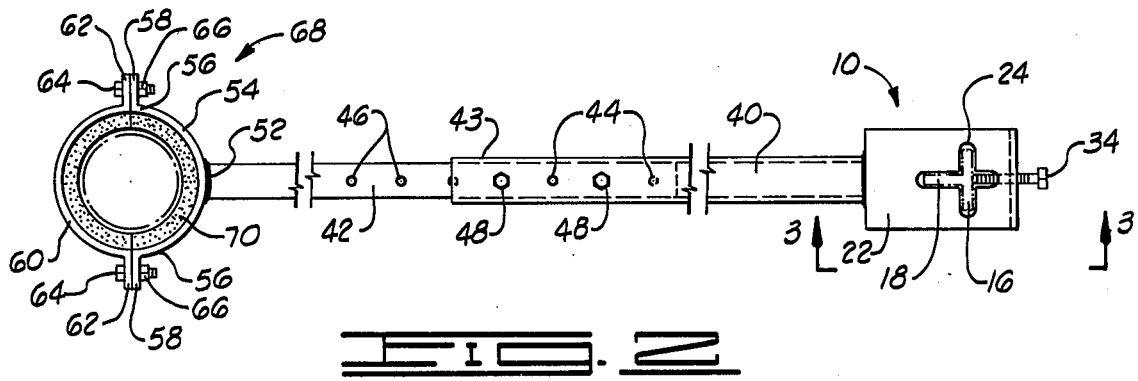
FIG. 2 is a plan view of the apparatus as a plant support, and also illustrates the bracket having one bolt for attaching to a T-shaped post.
Figure 3:
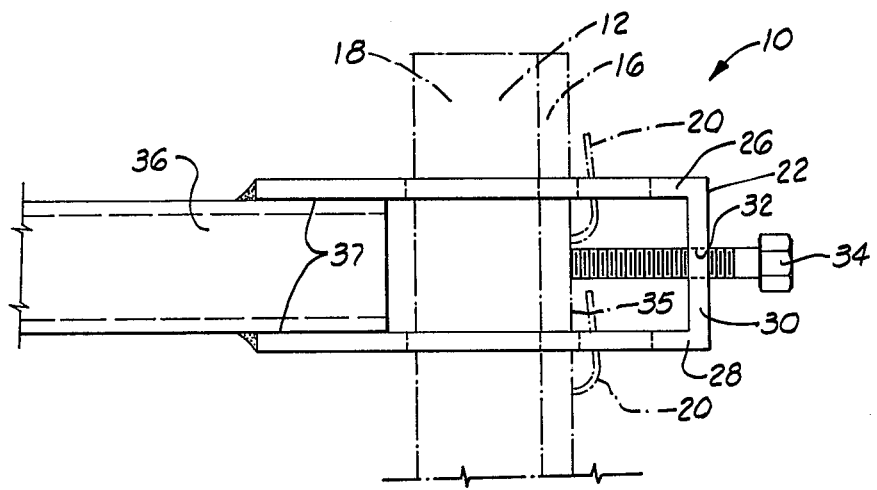
FIG. 3 is a detailed elevation view of the bracket as attached to a T-shaped post.

Referring now to the drawings and particularly to FIGS. 1, 2 and 3, the support apparatus for a cantilevered beam of the present invention is shown and generally designated by the numeral 10. The apparatus is designed for attachment to an upright post 12 having a lower end imbedded in a ground surface 14. The post has a substantially T-shaped cross section composed of a transverse flange 16 and a base flange 18 extending perpendicularly from a side of the transverse flange 16. On an opposite side of the transverse flange 16 are a spaced series of tangs 20 protruding therefrom.

A bracket 22 has a cross-shaped aperture 24 therein which slidingly registers with post 12. The bracket includes a pair of spaced horizontal plates 26 and 28 joined along one edge by a vertical center plate 30. The center plate 30 has a threaded hole 32 therein. A bolt 34 is threaded through hole 32 and bears against surface 35 of transverse flange 16 between a pair of tangs 20, thus providing fastening means for securely attaching bracket 22 to post 12.

Figure 4:
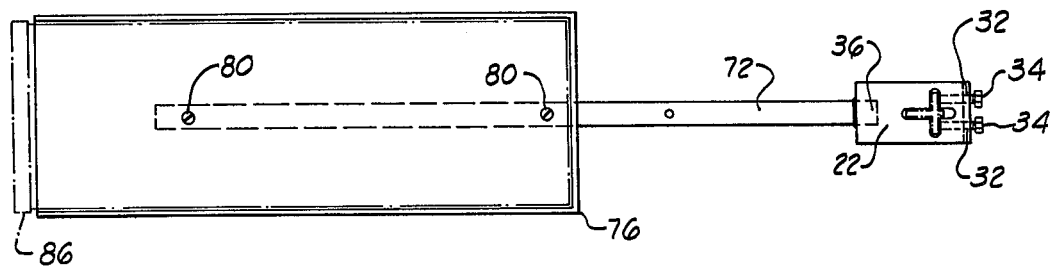
FIG. 4 is a plan view of the apparatus as a support for a mailbox or the like, and also illustrates the use of two bolts in the bracket for attaching to a T-shaped post.

An alternate method of fastening the bracket 22 to the post 12 is illustrated in FIG. 4 in which center plate 30 has a pair of holes 32 with a bolt 34 threaded through each. The bolts bear against surface 35 of transverse flange 16 such that they straddle the series of tangs 20.

In each of the embodiments of the invention hereinafter described, the cantilevered beam has a first end 36 disposed between spaced plates 26 and 28 in parallel contact with inwardly facing sides 37 thereof as best illustrated in FIG. 3. End 36 is fixedly attached to plates 26 and 28 by welding or the like.

Referring again to FIGS. 1 and 2, a first embodiment is shown in which the apparatus characterizes a plant support generally used in conjunction with a plant such as a tree 38. The cantilevered beam is composed of a first tubular member 40 having a large square cross section and a second tubular member 42 of a smaller square cross section slidingly disposed in a free end 43 of tube 40 opposite first end 36 providing a telescoping means to adjust the length of the cantilevered beam. A plurality of holes 44 are vertically disposed in tube 40, and corresponding holes 46 are vertically disposed in tube 42. At least one bolt 48 passes through a hole 44 and a hole 46, and is secured by a nut 50 to hold tubes 40 and 42 in a predetermined relationship.

Attached to a free end portion 52 of tube 42 is a first semi-cylindrical collar portion 54 opening radially outwardly. At each end 56 of collar 54 is a radially outwardly extending flange 58. A second semi-cylindrical collar portion 60 has a pair of similar flanges 62. Each flange 62 is in parallel contact with a flange 58 as illustrated in FIG. 2. A pair of bolts 64 secured by a nut 66 hold collar portions 54 and 60 together to form a cylindrical collar means generally indicated by numeral 68 around the stem of the tree or plant 38. A sheet of resilient material 70 is placed between cylindrical collar means 68 and the stem of the tree 38 to provide protection for the stem.

Figure 5:
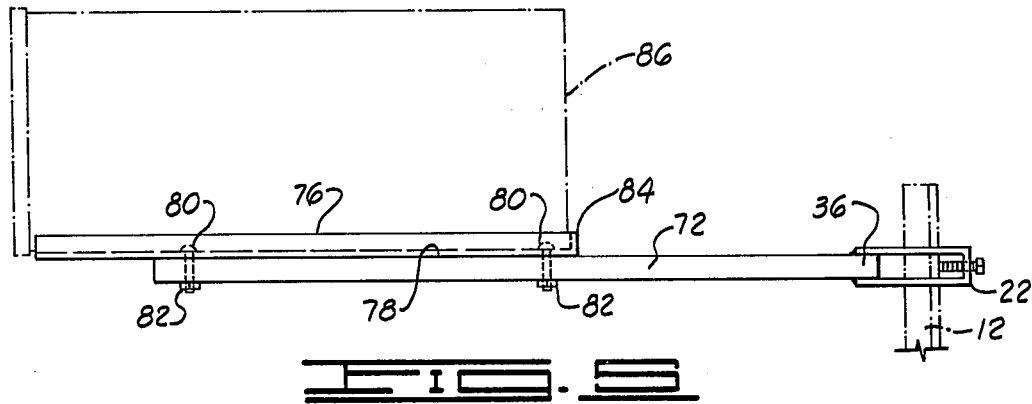

A second embodiment of the invention is illustrated in FIGS. 4 and 5 wherein the cantilevered beam is characterized as a support for a mailbox or the like. In this embodiment, a horizontal bar 72 of square cross section is attached to bracket 22 as hereinbefore described. A horizontal rectangular plate 76 is attached in parallel contact to an upper free end surface 78 of bar 72 by bolts 80 passing through plate 76 and bar 72, secured by nuts 82. A small vertical flange 84 extends from three edges of plate 76. Plate 76 is substantially the same size as the lower surface of a mailbox 86 indicated by phantom lines, and is interchangeable with other similar plates to accommodate various sizes of mailboxes 86 or the like.

Figure 6:
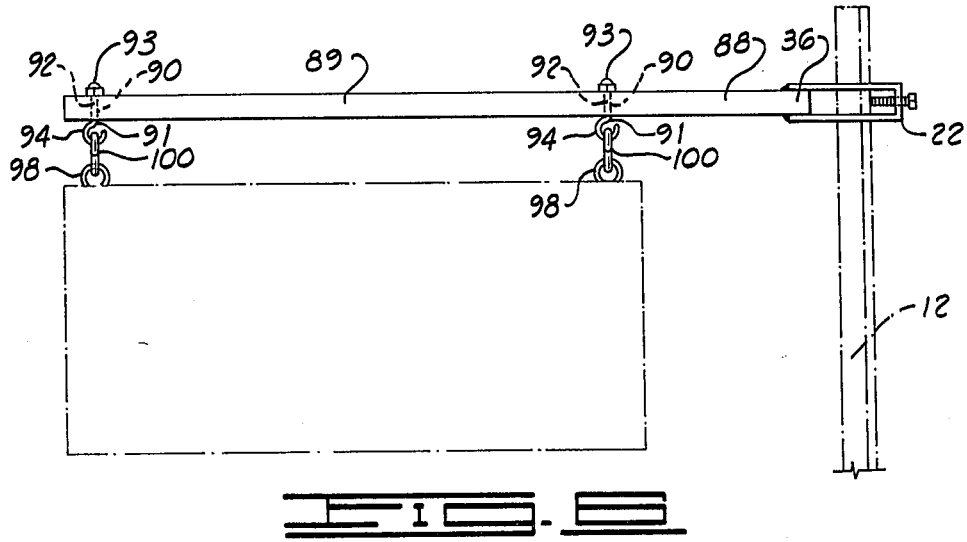
FIG. 6 illustrates a configuration in which the apparatus is used as a support for a hanging sign.

A third embodiment of the invention is illustrated in FIG. 6 wherein the cantilevered beam is characterized as a support for a hanging sign or the like. A bar 88 extends horizontally from bracket 22 and is attached thereto as hereinbefore described. Bar 88 is of substantially inverted V-shaped cross section with a free end portion 89 having a pair of spaced vertical holes 90 disposed therethrough. A pair of hooks 91 have a threaded, straight upper portion 92 extending through holes 90, secured by nuts 93, and a hook-shaped lower portion 94. The sign 96, shown in phantom lines, has a pair of eyes 98 attached thereto which are swingingly connected to hooks 91 by hangers 100.

Figure 7:
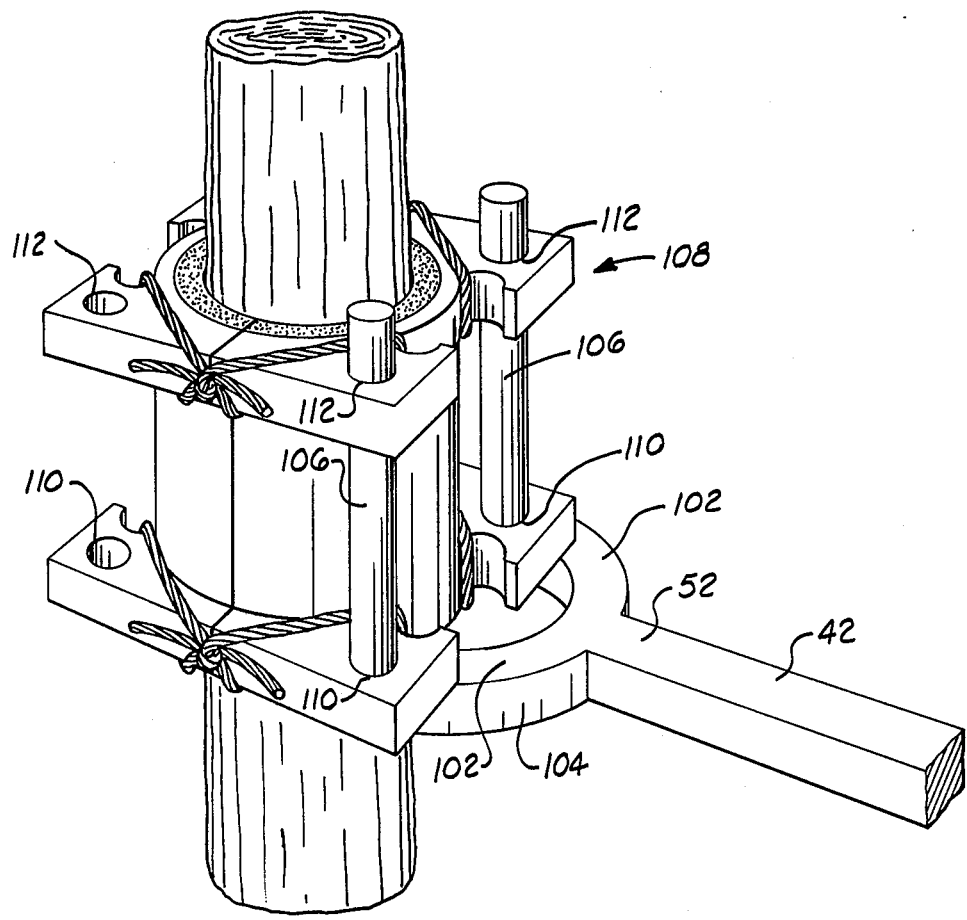
FIG. 7 is an isometric view in which is illustrated a support for a plant holder such as disclosed in U.S. Pat. No. 4,249,342.
Figure 8:
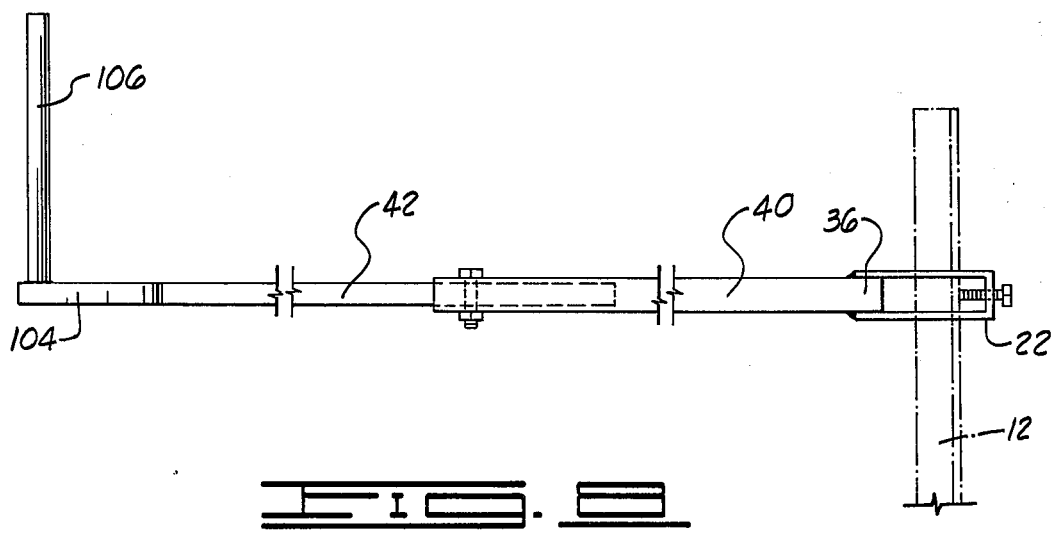
FIG. 8 is an elevation view of the embodiment of the invention illustrated in FIG. 7.

A fourth embodiment of the invention is illustrated in FIGS. 7 and 8 wherein the apparatus is characterized as a support for a plant holder such as that disclosed in U.S. Pat. No. 4,249,342, held by the inventor of the present invention. In this embodiment, the cantilevered beam is composed of a first tube portion 40 and a second tube portion 42 forming a telescoping means identical to that previously described in the first embodiment of the invention. Attached to the free end 52 of tube 42 are a pair of outwardly curving horizontal arms 102 which form a substantially semi-circular yoke 104. Extending upwardly from, and perpendicular to, each arm 102 is a cylindrical pin 106. As illustrated in FIG. 7, the plant holder, generally shown by numeral 108, of U.S. Pat. No. 4,249,342 has a set of lower holes 110 and a set of upper holes 112. Cylindrical pins 106 are spaced such that they will register through a pair of lower holes 110 and a pair of upper holes 112 in plant holder 108, thus providing support for plant holder 108 which rests on yoke 104. It will be easily seen by those skilled in the art that this embodiment of the invention may be used as a support for any device having a pair of appropriately spaced vertical holes therethrough, and is therefore not limited to the invention of U.S. Pat. No. 4,249,342.

Thus the support apparatus of the present invention is well adapted to carry out the objects and obtain the ends and advantages mentioned, as well as those inherent therein. While presently preferred embodiments of the invention have been described for the purpose of this disclosure, numerous changes in the construction and arrangement of the parts can be made by those skilled in the art, which changes are encompassed within the scope and spirit of this invention as defined by the appended claims.

What is claimed is:

1. A support apparatus for supporting a cantilevered beam from an upright post of substantially T-shaped cross section, said post having a transverse flange, a base flange perpendicularly extending from a center portion of a first side of said transverse flange, and a longitudinally spaced series of tangs protruding from a second side of said transverse flange opposite said first side, said support apparatus comprising:

a bracket including a pair of spaced horizontal plates having a cross-shaped aperture therein for vertically sliding registry with said upright post without interference with said tangs thereon, and a center plate facing said tangs joining said spaced plates along a first edge thereof, an end of said cantilevered beam being disposed between said spaced plates in contact with inwardly facing sides thereof and fixedly attached thereto adjacent a second edge of said spaced plates opposite said first edge; and fastening means operatively associated with said bracket for bearing against said second side of said transverse flange of said post in spaced relationship to said tangs to rigidly locate said bracket in a variable position thereon.

2. Apparatus of claim 1 wherein said fastening means is further characterized by:
said center plate defining a threaded hole through a center portion thereof; and
a bolt threaded through said hole to bear against said second side of said transverse flange between any pair of adjacent tangs.

3. Apparatus of claim 1 wherein said fastening means is further characterized by:
said center plate defining a pair of horizontally spaced threaded holes therethrough; and
a bolt threaded through each of said holes to bear against said second side of said transverse flange, said bolts straddling said series of tangs.

4. Apparatus of claim 1 wherein said cantilevered beam is characterized as a plant support comprising:
a bar having a free end opposite said fixed end;
a first semi-cylindrical collar portion having a radially outer surface fixedly attached to said free end of said bar;
a second semi-cylindrical collar portion; and
holding means for holding said first and second collar portions together to form a cylindrical collar means for surrounding a stem of a plant, said cylindrical collar means having a central axis therethrough.

5. Apparatus of claim 4 wherein:
said first and second collar portions each have radially outwardly extending opposite flange portions coplanar with said central axis, said flange portions of said first collar portion being in parallel contact with said flange portions of said second collar portion and each flange defining a corresponding hole therethrough; and
said holding means includes a bolt passed through each of said holes, secured by a nut.

6. Apparatus of claim 4 wherein said bar has a substantially square cross section.

7. Apparatus of claim 4 wherein said bar comprises telescoping means to allow telescopic movement of said free end toward or away from said fixed end.

8. Apparatus of claim 7 wherein said telescoping means of said bar comprises:
a large hollow tube portion defining a central opening therethrough, and extending from said fixed end of said bar having a series of spaced vertical holes therethrough;
a second small rod portion having a series of spaced vertical holes therethrough and slidingly engaged in said central opening of said large tube portion; and
at least one bolt extending through a hole in said large tube portion and through a corresponding hole in said small rod portion to hold said portions together in a predetermined relationship.

9. Apparatus of claim 8 wherein said large tube portion and said small rod portion have substantially square cross sections.

10. Apparatus of claim 8 wherein said small rod comprises a hollow tube.

11. Apparatus of claim 4 which further comprises a sheet of resilient material surrounding said stem of said plant between said stem and said cylindrical collar means.

12. Apparatus of claim 1 wherein said cantilevered beam is characterized as a support for a mailbox or the like comprising:
a bar having a free end opposite said fixed end and having a plurality of vertical holes therethrough;
a flat rectangular plate, of a size substantially coequal to a lower surface of said mailbox or the like, having a plurality of holes therethrough corresponding to said holes in said bar, and having a lower surface in parallel contact with an upper surface of said bar; and
a bolt extending through each of said holes in said plate and through said holes in said bar, secured by a nut to hold said plate to said bar.

13. Apparatus of claim 12 wherein said plate is interchangeable with at least one other plate of different size from said first-mentioned plate to support a variety of sizes of said mailbox or the like.

14. Apparatus of claim 12 wherein said bar has a substantially square cross section.

15. Apparatus of claim 1 wherein said cantilevered beam is characterized as a support for a hanging sign or the like comprising:
a bar having a free end opposite said fixed end and having a plurality of vertical holes therethrough;
hanging means having a substantially hooked shaped curved lower portion and a threaded upper portion extending upwardly through said holes in said bar and secured thereto by a nut, to provide means for hanging said sign or the like from said bar.

16. Apparatus of claim 15 wherein said bar has an inverted substantially V-shaped cross section.

17. A support apparatus for supporting a plant holder or the like from an upright post of substantially T-shaped cross section, said plant holder or the like having at least a pair of vertical holes therethrough and said post having a transverse flange, a base flange perpendicularly extending from a center portion of a first side of said transverse flange, and a longitudinally spaced series of tangs protruding from a second side of said transverse flange opposite said first side, said support apparatus comprising:
a bracket including a pair of spaced horizontal plates having a cross-shaped aperture therein for sliding registry with said upright post, and a center plate facing said tangs on said post joining said spaced plates along a first edge thereof;
a cantilevered beam comprising:
a bar having a fixed end disposed between said spaced plates in contact with inwardly facing sides thereof and fixedly attached thereto adjacent a second edge of said spaced plates opposite said first edge, said bar further having a free end opposite said fixed end;
an outwardly opening yoke extending from said free end of said bar;
a pair of cylindrical pins extending upwardly from said yoke fixedly attached thereto which slidingly register upwardly through said holes in said plant holder or the like, such that said plant holder or the like rests on an upper surface of said yoke; and
fastening means operatively associated with said bracket for bearing against said second side of said transverse flange of said post to rigidly locate said bracket in a variable position thereon.

18. Apparatus of claim 17 wherein said yoke comprises:

a pair of outwardly curving horizontal arms, each having a free end, said arms forming a substantially semi-circular opening; and wherein one of said cylindrical pins extends upwardly from said free end of each of said arms.

19. Apparatus of claim 18 wherein said bar comprises a telescoping means to allow telescopic movement of said free end toward or away from said fixed end.

20. Apparatus of claim 19 wherein said telescoping means of said bar comprises:

a large hollow tube portion defining a central opening therethrough, and extending from said fixed end of said bar having a series of spaced vertical holes therethrough;

a second small rod portion having a series of spaced vertical holes therethrough and slidingly engaged in said central opening of said large tube portion; and at least one bolt extending through a hole in said large tube portion and through a corresponding hole in said small rod portion to hold said portions together in a predetermined relationship.

21. Apparatus of claim 20 wherein said large tube portion and said small tube portion have substantially square cross sections.

22. Apparatus of claim 20 wherein said small rod comprises a hollow tube.

* * * * *